US006828505B1

(12) United States Patent
Peruzzotti et al.

(10) Patent No.: US 6,828,505 B1
(45) Date of Patent: Dec. 7, 2004

(54) METHOD AND ELECTRICAL APPARATUS COMPRISING A WATER TREE RESISTANT INSULATING COMPOSITION

(75) Inventors: Franco Peruzzotti, Legnano (IT); Luca Castellani, Corsico (IT); Luis José Dacal, Monza (IT); Valeria Garcia, Brugherio (IT)

(73) Assignee: Pirelli Cavi S.p.A., Milan (IT)

( * ) Notice: Subject to any disclaimer, the term of this patent is extended or adjusted under 35 U.S.C. 154(b) by 0 days.

(21) Appl. No.: 09/227,408

(22) Filed: Jan. 8, 1999

Related U.S. Application Data

(62) Division of application No. 08/718,711, filed on Sep. 24, 1996, now Pat. No. 6,521,695.

(30) Foreign Application Priority Data

Jun. 21, 1996 (IT) ............................................. 96830358

(51) Int. Cl.$^7$ ................................................ H01B 7/00
(52) U.S. Cl. ............................ 174/110 R; 174/110 SR; 174/120 SR
(58) Field of Search ..................... 174/110 R, 110 SR, 174/120 SR, 110 PM

(56) References Cited

U.S. PATENT DOCUMENTS

| | | |
|---|---|---|
| 2,718,509 A | 9/1955 | Lunsted et al. |
| 2,725,847 A | 12/1955 | Gramatke |
| 2,748,886 A | 6/1956 | Wildebour |
| 2,928,121 A | 3/1960 | Plumbo |
| 3,108,981 A | 10/1963 | Clark et al. |
| 3,122,341 A | 2/1964 | Le Bus, Sr et al. |
| 3,143,539 A | 8/1964 | Farhat |
| 3,206,429 A | 9/1965 | Broyles et al. |
| 3,222,151 A | 12/1965 | Schreffler |
| 3,265,482 A | 8/1966 | Langlois et al. |
| 3,301,932 A | 1/1967 | Chisholm |
| 3,361,702 A | 1/1968 | Wartman |
| 3,363,849 A | 1/1968 | McLarty |
| 3,422,049 A | 1/1969 | McClain |
| 3,432,483 A | 3/1969 | Peoples et al. |
| 3,499,791 A | 3/1970 | Maloney |
| 3,530,201 A | 9/1970 | Schwarcz |
| 3,534,132 A * | 10/1970 | Bailey et al. ............... 264/104 |
| 3,746,681 A | 7/1973 | McLain |
| 3,758,013 A | 9/1973 | Johnson |
| 3,795,646 A | 3/1974 | MacKenzie, Jr. et al. |
| 3,839,526 A | 10/1974 | Riley et al. |
| 3,928,525 A | 12/1975 | Fuwa et al. |
| 3,939,532 A | 2/1976 | Wiegand |
| 3,956,420 A | 5/1976 | Kato et al. |
| 4,030,901 A | 6/1977 | Kaiser |
| 4,042,723 A | 8/1977 | Presby |
| 4,048,131 A | 9/1977 | Keske et al. |
| 4,076,510 A | 2/1978 | Mracek et al. |
| 4,078,372 A | 3/1978 | Stahlecker |
| 4,102,661 A | 7/1978 | Dudderar et al. |
| 4,123,242 A | 10/1978 | Imoto et al. |
| 4,124,728 A | 11/1978 | Marcuse et al. |
| 4,126,436 A | 11/1978 | Bailey |
| 4,156,044 A | 5/1979 | Mracek et al. |
| 4,163,370 A | 8/1979 | Kurth |
| 4,174,842 A | 11/1979 | Partus |
| 4,194,896 A | 3/1980 | Symborski et al. |
| 4,204,852 A | 5/1980 | Watts et al. |
| 4,206,260 A | 6/1980 | McMahon |
| 4,208,200 A | 6/1980 | Claypoole et al. |
| 4,232,838 A | 11/1980 | Bravin |
| 4,236,904 A | 12/1980 | Lazay |
| 4,283,459 A | 8/1981 | Urban et al. |
| 4,293,459 A | 10/1981 | Detroit |
| 4,305,849 A | 12/1981 | Kawasaki et al. |
| 4,314,834 A | 2/1982 | Feenstra et al. |
| 4,316,714 A | 2/1982 | Pfeiffer et al. |
| 4,317,666 A | 3/1982 | Faure et al. |
| 4,321,072 A | 3/1982 | Dubos et al. |
| 4,331,463 A | 5/1982 | Briere et al. |
| 4,340,563 A | 7/1982 | Appel et al. |
| 4,351,658 A | 9/1982 | Olshansky |
| 4,370,355 A | 1/1983 | Niesse |
| 4,370,517 A | 1/1983 | Soma et al. |
| 4,373,943 A | 2/1983 | Gouronnec et al. |
| 4,400,190 A | 8/1983 | Briere |
| 4,407,666 A | 10/1983 | Briere |

(List continued on next page.)

FOREIGN PATENT DOCUMENTS

| | | | |
|---|---|---|---|
| CA | 1175656 | 10/1984 | |
| DE | 26 55 996 A1 | 6/1977 | |
| EP | 0 029 759 A1 | 6/1981 | |
| FR | 1 316 554 | 5/1963 | |
| FR | 1 587 836 | 3/1970 | |
| FR | 2 040 220 | 2/1971 | |
| FR | 2 312 788 | 12/1976 | |
| FR | 2 368 677 | 5/1978 | |
| JP | 51-141646 | 12/1976 | |
| WO | WO 83/01060 | 3/1983 | |
| ZA | 9105841 A * | 3/1992 | ........... H01L/00/00 |

OTHER PUBLICATIONS

Database WPI, Section Ch, Week 8204, JP–A–56–161443 (Abstract), Dec. 11, 1981.
Database WPI, Section Ch, Week 8414, JP–A–59–035315 (Abstract), Feb. 27, 1984.
Filippini, "Water Tree Meter, An Automatic Equipment For Water Treeing Measurements In Insulation Materials For Cables", pp. 161–166.

*Primary Examiner*—Judy M. Reddick
(74) *Attorney, Agent, or Firm*—Finnegan, Henderson, Farabow, Garrett & Dunner, L.L.P.

(57) ABSTRACT

The present invention is an improved electric insulation composition of a polymer and an additive that reduces water treeing due to electrical aging in water. The polymer additive is a hydrophobic/hydrophilic material with good compatibility with the polymer. The present invention is also a method of preventing electrical breakdown due to the formation of water trees by forming electrical cables with the insulation containing the disclosed anti-treeing additives.

29 Claims, 1 Drawing Sheet

U.S. PATENT DOCUMENTS

| | | | |
|---|---|---|---|
| 4,410,344 A | | 10/1983 | Iyengar |
| 4,440,671 A | * | 4/1984 | Turbett ........................ 252/573 |
| 4,612,139 A | * | 9/1986 | Kawasaki et al. ........... 252/511 |
| 4,623,755 A | * | 11/1986 | Henkel et al. ......... 174/110 SR |
| 4,626,619 A | * | 12/1986 | Uematsu ............... 174/106 SC |
| 4,694,138 A | * | 9/1987 | Oodaira et al. ........ 219/121.85 |
| 4,812,505 A | * | 3/1989 | Topcik ........................ 524/377 |
| 5,151,561 A | | 9/1992 | Emery et al. |
| 5,234,790 A | | 8/1993 | Lang et al. |
| 5,254,403 A | | 10/1993 | Malhotra |
| 5,302,810 A | | 4/1994 | Gauthier et al. |
| 5,420,185 A | * | 5/1995 | Watanabe et al. ............ 524/210 |
| 5,571,614 A | | 11/1996 | Harrison et al. |
| 5,656,371 A | * | 8/1997 | Kawahigashi et al. ...... 428/375 |
| 5,871,706 A | * | 2/1999 | Whitehouse ............. 423/449.2 |
| 5,872,177 A | * | 2/1999 | Whitehouse ................ 524/495 |
| 6,005,192 A | * | 12/1999 | Mashikian et al. ..... 174/110 R |
| 6,277,908 B1 | * | 8/2001 | Yamamoto .................. 524/436 |

\* cited by examiner

METHOD AND ELECTRICAL APPARATUS COMPRISING A WATER TREE RESISTANT INSULATING COMPOSITION

This application is a divisional of U.S. application Ser. No. 08/718,711, filed Sep. 24, 1996, now U.S. Pat. No. 6,521,695, which is incorporated herein by reference.

The present invention relates to an improved electrical insulation composition. More particularly, the present invention relates to an electrical insulation that may be used effectively in the presence of water. Specifically, the present invention relates to an improved electrical insulation composition that maintains high breakdown strength over time, by minimizing the formation of water trees.

FIELD OF THE INVENTION

The present invention further relates to a method of preventing the formation of water trees in polymeric electrical insulation composition. The present invention still further relates to an electrical cable containing an insulation composition effective to prevent water trees in the presence of moisture.

BACKGROUND OF THE INVENTION

Electrical hardware, for example, electric cable, is often used in the presence of or in direct contact with water. When electrical hardware, particularly an electric cable, is operated in the presence of water, the electrical insulation composition used to surround and insulate the hardware is often deteriorated by the water. Thus, medium and high voltage power cables may be subject to dielectric breakdown by a mechanism known in the art as "water treeing."

In the present description medium voltage power cable refers to a cable which operates at a voltage in the range from about 1 up to about 70 kV and high voltage power cable refers to a cable which operates at a voltage greater than about 70 kV. Medium and high voltage power cables are generally constructed in two basic designs. In the so-called "dry design" a metallic sheath, such as lead, encloses the cable insulation, thereby assuring that the cable insulation always remains in a perfectly dry condition. In the other, called "wet design", a polymeric sheath encloses the cable insulation and, unlike the metal sheath, this polymeric sheath cannot completely prevent diffusion of water, from the outside environment, into the cable insulation layer.

In this "wet design" second cable design, when the cable is exposed to a water or moisture containing environment, in the presence of electric stress, a degradation of the electrical breakdown strength is observed over time.

This decay of the electrical properties of the insulation under wet conditions is believed to be due to a phenomenon in the art called "water treeing".

Water treeing refers to the degradation process of the insulation resulting in the formation of microchannels or tubes having a treelike appearance. A water tree is initiated at stored areas of water, for examples a defect in the insulation material and may become significant when an electrical field is applied to the electrical insulation. In order to prevent early failure during the operation of the hardware, it becomes necessary to minimize the formation of water trees in the insulator surrounding the electrical hardware.

Prior art insulation materials were often modified by the addition of a material which bonds with water to avoid high local water concentration within the insulation. A number of additives have been proposed in an attempt to minimize or prevent insulation failure by minimizing and preventing the formation of water trees.

A general discussion of this phenomenon and examples of these additives can be found in for example, U.S. Pat. No. 3,499,791 to Maloney; U.S. Pat. No. 3,956,420 to Kato et al.; U.S. Pat. No. 3,795,646 to MacKenzie Jr.; U.S. Pat. No. 4,206,260 to McMahon; U.S. Pat. No. 4,370,517 to Soma et at.; and U.S. Pat. No. 4,293,459 to Urban et al.

One prior art insulation material, described in U.S. Pat. No. 4,305,849, combines polyethylene glycol with a polyolefin insulating material. Polyethylene glycol suffers from the disadvantage that while it is hydrophilic, making it attractive to water, it has poor compatibility with the insulating polyolefins, such as apolar polyethylene. Because of its poor compatibility, polyethylene glycol is believed to be dispersed as small droplets throughout the polyolefin insulation, these droplets acting as points of attraction for any water diffusing within the insulation. As water accumulates around the additive, areas of high local water concentration may be generated, that can themselves result in defects.

Accordingly, it has been found that, while the addition of polyethylene glycol can delay the onset of water tree formation, over time, it usually results in an overall increase in the number of water trees found in an insulation after a certain period of time.

As noted in U.S. Pat. No. 4,305,849, low hydrophilic, or hydrophobic materials, such as polypropylene glycol, do not prevent the formation of water trees in the insulation.

SUMMARY OF THE INVENTION

The present invention provides significant improvements over the prior art compositions by including as an additive within an electrical insulator a material that combines the properties of hydrophilicity, hydrophobicity and mobility within the insulating material.

According to an aspect of the present invention, it has been found that improved water treeing resistance can be obtained by using additives which:

1) possess sufficient hydrophilicity to allow the polyolefin to link water molecules and prevent them from diffusing in the material;
2) possess sufficient compatibility with the polyolefin, to prevent loss or clustering of the additive and maintain diffused water distributed evenly in the mass; and
3) possess a mobility of the hydrophilic portion within the polymeric matrix suitable to allow the hydrophilic portion of the additive to effectively reach and link the diffusing water molecules.

Further advantages of the invention will be set forth in part in the description which follows and in part will be apparent from the description, or may be learned by practice of the invention. The advantages of the invention may be realized and attained by means of the instrumentalities and combinations particularly pointed out in the appended claims.

In a first aspect, the present invention refers to an electrical apparatus having at least a polymeric insulation layer, said layer comprising an electrical insulating composition containing as a major component a polyolefin, characterized in that it comprises an effective amount of a water-tree resistant additive having:

a hydrophilic portion, causing a water absorption in said polymeric insulation layer within a selected absorption range, a compatible portion with said polyolefin, causing an additive loss by contact with water lower than a selected loss value, and a mobility of said hydrophilic portion corresponding to a mobility suitable to allow the hydrophilic portion of the additive to effectively reach and link water molecules diffusing in said insulating composition, such that said polymeric insulation layer has a residual electrical breakdown strength greater than about 35 kV/mm after 120 days accelerated water treeing test according to AEIC CS 5-94.

In a further aspect the present invention concerns an electrically insulating composition containing as a major component a polymer composition selected from the group consisting of polyolefins, characterized in that said composition further contains an effective amount of a polymeric additive having:

a hydrophilic portion, causing a water absorption in said composition within a selected absorption range, and a compatible portion with said composition, causing an additive loss from said composition, by contact with water, lower than a selected loss value, said hydrophilic portion having a mobility suitable to allow the hydrophilic portion of the additive to effectively reach and link water molecules diffusing in said insulating composition, such as to provide an electrical breakdown strength decay in the insulation composition lower than 30% in a 30 days accelerated aging test in water.

In particular, said selected water absorption range is such that the water content of said electrical insulating composition is at least 10% higher than that of the same pure polyolefin with the same aging and increases less than 50% in the period from 100 to 400 hours of exposure to 100% relative humidity at 80° C.

In addition, said water absorption is such that the water content of said electrical insulating composition is less than 10,000 ppm after 400 hours of exposure to 100% relative humidity at 80° C.

In particular, said additive loss by contact with water is not greater than about 20% by weight after 120 days accelerated water treeing test according to AEIC CS 5-94. In particular, said mobility corresponds to a contact angle with water of said composition of less than a preselected value; more particularly, said contact angle is less than 75° and, preferably, less than 70° (according to ASTM D 724-45, using insulating material in the place of the paper).

Said polyolefin is preferably selected from the group consisting of low, medium and high density polyethylene, linear low density polyethylene, ethylene-vinyl acetate copolymer, ethylene-ethyl acrylate copolymer, ethylene-ethyl acrylate copolymer, ethylene-ethyl methacrylate copolymer, ethylene-propylene copolymer, ethylene-propylene-diene terpolymer, polypropylene, and mixtures thereof.

In a preferred embodiment the hydrophilic portion is made up of polar units, preferably linear alkene oxide units and, more preferably, ethylene oxide.

In a preferred embodiment the compatible portion is made of aliphatic, aromatic or low polarity units; preferably a hindered alkene oxide, and, more preferably the compatible portion is propylene oxide.

Most preferably, the additive is an ethylene-oxide/propylene-oxide block copolymer, in which the ethylene oxide portion in the additive is from 50 to 80% by weight.

In an alternative embodiment, the compatible portion is a group graftable to said polyolefin and, preferably, an unsaturated aliphatic unit, particularly an allyl containing group.

In another preferred embodiment the compatible portion and the hydrophilic portion are chemically linked to a low polarity group, preferably an amino group, particularly ethylenediamine.

Preferably, the effective amount of water-tree resistant additive is from about 0.1 to about 10% by weight and, most preferably, from about 0.2 to about 0.5% by weight In a further aspect, the present invention concerns a method for reducing water trees growth in an electrical apparatus having a polymeric insulation layer including a polyolefin as a major component, characterized in that it comprises:

providing an additive in said apparatus;

causing at least a portion of said additive to move and get in contact with water diffusing in said polymeric insulation layer;

causing diffusing water to become linked in an hydrophilic portion of the additive;

causing said additive to link to said polymeric insulation layer.

In a preferred embodiment of the method, causing at least a portion of said additive to move and get in contact with diffusing water comprises providing an additive substantially free to move within said polymeric insulation layer, and causing said additive to link to said polymeric insulation layer comprises providing an additive having an hydrophobic molecular portion.

In an alternative embodiment causing said additive to link to said polymeric insulation layer comprises grafting said additive to said polymeric insulation layer and causing at least a portion of said additive to move and get in contact with diffusing water comprises providing an additive grafted to said polymeric insulation layer and having said hydrophilic portion spaced apart from the graft position.

BRIEF DESCRIPTION OF DRAWING

Further details will be apparent from the following detailed description, with reference to the enclosed drawing, in which.

DETAILED DESCRIPTION

Figure 1:
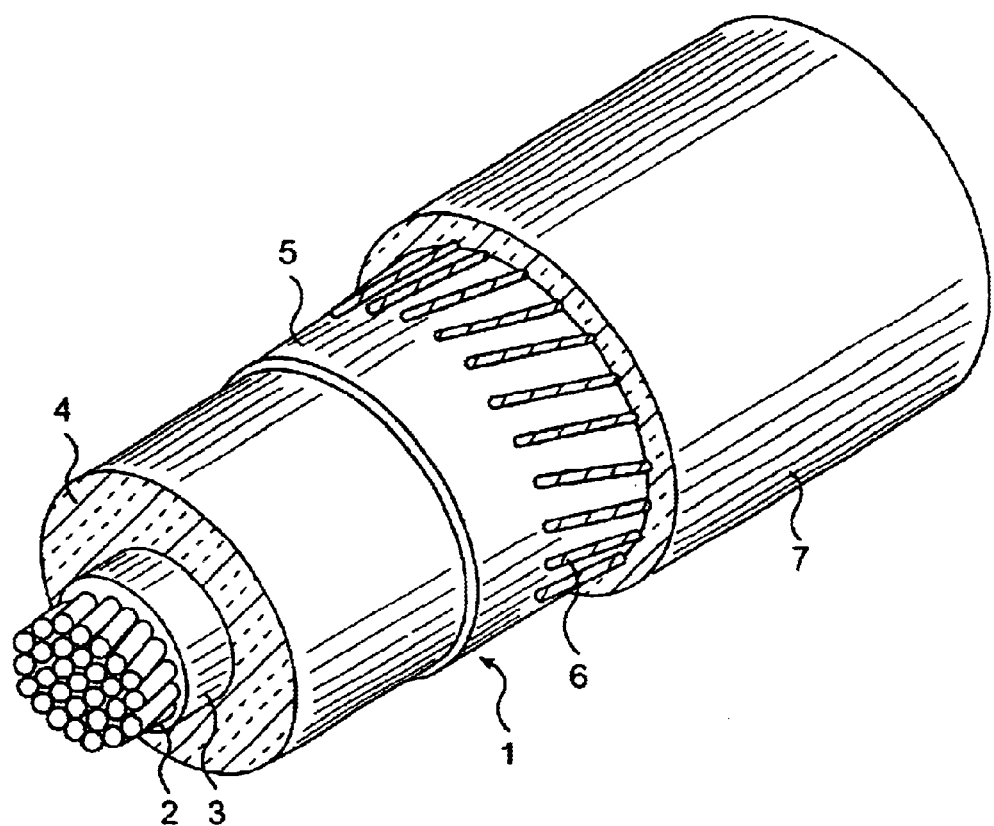
FIG. 1 is a perspective view of an electrical cable according to the present invention.

In the FIGURE an insulated electrical cable 1 includes a conductor 2; an internal sublayer 3; an electrically insulating layer 4; and an external sublayer 5; a metallic screen 6; and an outer sheath or jacket 7.

The conductor 2, as known in the art, is preferably made of stranded metal wires, The internal and external sublayers 3 and 5 are preferably made of suitable compounds according to the prior art, extruded onto the conductor 2 separately from or simultaneously with the insulating layer 4.

The insulating layer 4 is preferably formed with the composition according to the present invention, described in detail below.

The internal sublayer 3, usually called in the art "conductor shield" is an electrically semiconducting layer for causing the electric field to be uniform around the conductor.

Methods and materials for making the shield layer will be readily apparent to the skilled artisan.

In a cable according to the present invention the internal sublayer 3 is preferably made of a compound based on cross-linked polyethylenealkylacrylate, charged with carbon-black, to render it semiconducting (i.e. with a resistivity <5 ohm/m at room temperature).

The external sublayer 5, usually called in the art "insulation shield" is a semiconductive layer, methods and materials for making this layer will be readily apparent to the skilled artisan.

In a cable according to a preferred embodiment of the present invention the external sublayer 5 is made from a compound based on EVA (ethylenevinylacetate), charged with carbon black to make it semiconducting.

Such layer, as is well known to the skilled in the art has the object of circumscribing the electrical field round the conductor.

Externally to the outer semiconductive layer 5 there is a metallic screen 6, made of electrically conducting wires or tapes, helically wound, and a sheath or jacket 7 in polyvinylchloride (PVC) or thermoplastic polyethylene (PE).

In an example, a medium voltage cable, defined as 1/0 AWG (American Wire Gauge), 175 mils (4.45 mm) insulation thickness, for a voltage of 8.7–15 kV, can have the following dimensions

| | |
|---|---|
| conductor cross-section = | 53.5 mm$^2$; |
| diameter of conductor = | 9.30 mm; |
| external diameter of inner semiconductive layer = | 10.10 mm |
| external diameter of the insulating layer = | 19.00 mm |
| external diameter of outer semiconductive layer = | 21.00 mm |
| outer sheath diameter = | about 27.00 mm. |

The polymeric electrical insulating composition for insulation layer 4 of the present invention has as its major component an insulating polymer.

The insulating polymer of the present invention may be, for example, polyethylene or a copolymer or terpolymer produced using comonomers selected from, for example, propylene, butene-1, hexene-1, octene-1, decene-1, norbornene, butadiene, vinyl acetate, ethyl acrylate, methyl acrylate, isobutyl acrylate and methyl vinyl ether, mixtures thereof, and the like.

Insulating polymers which may be used in accordance with the present invention may be selected from, for example, low, medium and high density polyethylene, linear low density polyethylene, ethylene-vinyl acetate copolymer, ethylene-ethyl acrylate copolymer, ethylene-methyl acrylate copolymer, etylene-ethyl methacrylate copolymer, ethylene-propylene copolymer, ethylene-propylene-diene terpolymer, polypropylene, mixtures thereof and the like.

The term linear low density polyethylene, to the purposes of the present invention, includes polymers with a density between 0.86 and 0.93, such as, for example, those known in the art as LLDPE (linear low density polyethylene), VLDPE (very low density linear polyethylene).

The insulating polymers for use in the present invention may or may not be crosslinked.

One preferred insulating polymer of the present invention is low density polyethylene (LDPE), more preferably crosslinked polyethylene (XLPE).

The density of preferred insulating polymers for use in the present invention is preferably less than about 0.93 kg/l, more preferably between about 0.86 and about 0.93 kgA, and most preferably about 0.92 kg/l. Preferred insulating polymers of the present invention have a melt flow index of between about 0.02 and about 20 g/10 min most preferably between about 1 and about 4.0 g/10 min, and most preferably about 2.0 g/10 min.

The afore described insulating polymers constitutes the major component in the preferred electrical insulation composition of the present invention. Preferred cable insulation compositions of the present invention contain an anti-treeing additive in an amount of from about 0.01 to about 10% by weight more preferably from about 0.1 to about 3% by weight, most preferably from about 0.2 to about 1% by weight The additive according to the present invention has 1) an hydrophilic portion; 2) a compatible portion; and 3) a mobility that allows the hydrophilic portion to effectively reach and link water molecules.

As used herein, the compatible portion refers to either a hydrophobic portion of the molecule or a portion capable of grafting with the insulating polymer.

By hydrophobic portion, to the purpose of the present invention, we mean a molecular portion which, when the additive is dispersed or otherwise blended in the insulating polymer, shows a sufficient chemical affinity with the insulating polymer to cause the additive to remain stably dispersed in the insulation in the operating condition of the cable or electric hardware including the insulation.

By hydrophilic portion, to the purpose of the present invention, we mean a molecular portion which, when the additive is dispersed or otherwise blended in the insulating polymer, shows a sufficient chemical affinity with water to maintain it stably linked to the additive in the operating condition of the cable or electric hardware including the insulation.

In one embodiment of the present invention, an additive having hydrophilic properties is grafted to an electrical insulation material during the curing of the insulator. Examples of materials which may be used in this embodiment of the invention include allylethoxy derivatives, for example ATPOL I-ID863 produced by ICI.

In another embodiment of the present invention, the anti-treeing additive for use with the present invention combines a hydrophilic portion with a hydrophobic portion to improve the compatibility of the additive with the polyolefin while retaining the benefit of the hydrophilic additive.

The hydrophilic portion of the additive is preferably selected from polar units, more preferably linear alkene oxide units, most preferably ethylene-oxide units. The hydrophobic portions of the additive are preferably selected from units having little or no polarity, more preferably from hindered alkene oxide units, most preferably propylene oxide.

A preferred additive according to the present invention is selected from ethylenoxy-propylenoxy copolymers. The copolymers may be in any structure, randomized, alternating or block copolymers. Examples of these copolymers are commerically available under the trade name PLURONIC from BASF or SYNPERONIC from ICI.

The compositions of the present invention may contain additional components, including cross-linking agents, antioxidants, fillers, processing aids, lubricants and pigments. The range of available materials which may be added to the composition of the present invention is not limited and includes those materials which do not adversely affect the insulating properties of the composition.

Cross-linking agents for use in the present invention include peroxide cross-linking agents selected from organic peroxides, such as dicumylperoxide; bis(terbutylperoxyisopropyl)benzene; terbutylcumylperoxide, mixtures thereof and the like.

Antioxidants for use in the present invention include polymerized trimethyl dihydroquinoline; 4,4'-thiobis(3-methyl-6-t-butyl)phenol; pentaerythrityl-tetrakis[3-(3,5-diterbutyl-4-hydroxyphenyl)propionate]; and 2,2'-thiodiethylenebis-[3-(3,5-ditertbuthyl-4-hydroxyphenyl)propionate], mixtures thereof and the like. Fillers for use in the present invention include glass particles, glass fibers, calcinated clay, talc, mixtures thereof, and the like. Processing aids for use in the present invention include calcium stearate, zinc stearate, stearic acid, paraffinic wax, mixtures thereof, and the like.

The following examples are not to be construed as limiting the invention as described herein.

EXAMPLES

A number of compositions were prepared as described below.

Comparative Example 1

Example 1 is a control sample of cross-linked polyethylene (XLPE) containing no tree-retardant additive. This material provided a reference for comparing prior art additives and those of the present invention.

The insulation material of the control was prepared by combining 100 parts of low density polyethylene, ESCORENE LD 400 from Exxon; with 0.34 parts (per 100 parts polymer) of a phenolic antioxidant, SANTONOX R CABLE GRADE from Flexis; and 2.20 parts (per 100 parts of polymer) of dicumylperoxide, DICUP from Hercules.

Comparative Examples 2–4

Each of the insulation materials was prepared by adding to the composition described in Example 1 above 0.50 parts (per 100 parts of polymer) of an additive described below.

In Examples 2 and 3 ethoxyacrylate additives were added in accordance with U.S. Pat. No. 4,370,517. The basic structure of these additives is:

$$CH_2=C(CH_3)COO-(CH_2CH_2O-)_nCO-C(CH_3)=CH_2,$$

where the group $CH_2CH_2O$ is the ethylene oxide group, designated in the following EO.

These additives become grafted to the polyethylene, during peroxide crosslinking, at both sides of the molecula chain (i.e. the unsaturated ends).

Both the additives of examples 2, 3 were supplied by Cray Valley, under the name Sartomer.

In example 2 Sartomer 252, was used, having value n=13, i.e. 13 EO groups.

In Example 2 the ester group content is 12%, the EO content is 79%, and the total O is 35% by mole percent in the additive molecule.

Example 3 Sartomer 205 was used, having value n=3, i.e. 3 EO groups.

In Example 3 the ester group content is 31%, the EO content is 46%, total O is 34% by mole percent in the additive molecule.

Example 4 uses a polyethylene glycol additive in accordance with U.S. Pat. No. 4,305,849.

The structure of the additive is:

$$(CH_2CH_2O)_n$$

The tested additive was supplied by Aldrich under the name of PEG 8000.

The total O content of this material was 36.4% (approx. in the additive molecule). Average molecular weight about 8000.

Examples 5–8

Examples 5–8 are electrical insulation materials according to the present invention. Each of the insulation materials was prepared by adding to the composition described in Example 1 above 0.50 parts (per 100 parts of polymer) of an additive described below.

In Example 5 an allylethoxy derivative was added.

The basic structure of this additive is:

$$CH_2=CHCH_2O-(CH_2CH_2O)_{12}H.$$

The tested additive was supplied by ICI under the name of Atpol HD863.

The EO content is 90% and total O is 35% (approx. in the additive molecule).

This monomer grafts to the polyethylene during peroxide crosslinking, but only one side of the molecula chain (i.e. the unsaturated end) is graftable.

Examples 6 and 7 are ethyleneoxy, propyleneoxy copolymers having 80% EO units and 50% EO units respectively.

The basic structure of these additives is:

$$H-(CH_2CH_2O)_n-(CH_2CH(CH_3)O)_m-H,$$

where the group $-(CH_2CH(CH_3)O)_m-$ is the propylene oxide unit, designated in the following PO.

The tested additives were supplied by BASF under the name of PLURONIC.

In Example 6 the additive was Pluronic 6800, having an EO/PO ratio of 80/20 and an O content approximately of 34.6% in the additive molecule.

Average molecular weight was about 8500.

In Example 7 the additive was Pluronic 10500, having an EO/PO ratio of 50/50 and an O content approximately of 32% in the additive molecule.

Average molecular weight was about 6500.

Example 8 is an ethoxy/propoxy diamine derivative material (diethylamine ethoxy/propoxylate), having the structure:

$$\begin{array}{cc} H-(EO)_n-(PO)_m & (PO)_m-(EO)_n-H \\ \diagdown & \diagup \\ & NCH_2CH_2N \\ \diagup & \diagdown \\ H-(EO)_n-(PO)_m & (PO)_m-(EO)_n-H \end{array}$$

The ratio n/m for this material was 40/60.

The tested additive was supplied by BASF under the name of Tetronic 904.

The additive had an average molecular weight of 6700 (g/mol), an EO content of 40%, and a total O content of 30% (approx. in the additive molecule).

Example 9

The above samples were tested in accordance with the EFI test method as described in H. Faremo and E. IIdstadt, "The EFI test method for accelerated growth of water trees" IEEE, 1990.

The electrical insulation compositions described above were obtained by melt-blending all noted additives into the polyolefin insulating matrix, i.e. polyethylene.

The blends were then processed in a laboratory Brabender twinscrew mixer at the temperature of the melted components, i.e. about 130° C.

Curing was done at about 180° C.

The two insulation shields used to monitor aging were made of LE 0592, semiconductive material/supplied by Borealis.

The aging conditions used for the tests examples were as follows:

| a) Temperature | 70° C., continuous heating |
|---|---|
| b) Electrical Stress | 5 kV/mm, 50 Hz a.c. |

Tap water was maintained in the specimen cup.

After 10 and 30 days of aging (180 days for one example), electrical breakdown strength (Eb) was measured. The aged values were compared with unaged samples to obtain the water tree resistance performance of the insulation materials.

Tests results are summarized in Table 1 below.

Table 2 shows that the presence of the additive provides a certain degree of water absorption (i.e. a certain amount of hydrophilicity) to the polymer, when compared with pure polyethylene.

Specifically, in pure polyethylene the water content, after an initial period of relatively rapid increase (lasting about 100 hours), increases very slowly over time, about 450–500 ppm every 100 hours.

In the comparative composition of Example 4, the water content increases substantially regularly over the entire test period, and at a higher rate than that of pure polyethylene.

Specifically, comparative composition of Example 4 gains more than 4000 ppm of water every 100 hours, without showing a tendency to stabilize.

TABLE 1

| | Additive | Commer. | | | Electrical Breakdown (kV/mm) | | | | |
|---|---|---|---|---|---|---|---|---|---|
| | | | | | | after aging (days) | | | retained value |
| Example | Type | Name | Supplier | original | 10 | 30 | 180 | after 30 days (%) |
| 1 | none | Escorene LD 400 | Exxon | 105 | 50 | 45 | — | 43 |
| 2 | *acrylate(n)etoxy derivative, n = 13 | Sartomer 252 | Cray Valley | 124 | 82 | 80 | — | 84 |
| 3 | *acrylate(n)etoxy derivate, n = 3 | Sartomer 205 | Cray Valley | 117 | 62 | 51 | — | 43 |
| 4 | *PEG | PEG 8000 | Aldrich | 107 | 83 | 70 | — | 65 |
| 5 | allyl-(n)-ethoxy deriv. (n = 12) | Atpol HD863 | ICI | 110 | 86 | 79 | — | 72 |
| 6 | EO/PO 80/20 | Pluronic 6800 | BASF | 110 | 110 | 98 | 85 | 89 |
| 7 | EO/PO 50/50 | Pluronic 10500 | BASF | 115 | 99 | 94 | — | 82 |
| 8 | ethoxy/propoxy diamine deriv. | Tetronic 904 | BASF | 105 | 85 | 81 | — | 77 |

*Prior art insulation additives

Example 10

The hydrophilicity of the additives of Examples 1, 4 and 6 has been evaluated by measuring the water uptake in a conditioning room at 100% relative humidity at 80° C.

Plaques of 200×200 mm, 1.5 mm thickness were prepared by compression molding and cross-linking the compositions of Examples 1, 4, 6 at a pressure of 200 bar and a temperature of 180° C. for a time of 30 min.

After molding the plaques were thermally conditioned for 3 days at 90° C. in order to eliminate the by-products of cross-linking.

The plaques were exposed in a conditioning room at 100% of relative humidity and a temperature of 80° C.

Water content tests were carried out with a Karl-Fisher instrument

The results are set forth below in Table 2 below.

The inventive composition of Example 6, by contrast, exhibits a faster water content increase than pure polyethylene (similar to that of Example 4) in the first 100 hours period, but thereafter it shows a slower water content increase (at a rate similar to that of pure polyethylene).

By comparing the result set forth in Table 2 with those set forth in Table 1, it can be observed that, while a certain amount of hydrophilicity of the compound is useful to reduce electrical breakdown strength decay, continued or significant increases in this property are not useful to this purpose.

In addition, it must be noted that an excessively high water absorption value, as caused by excessive hydrophilicity of the additive or by an excessive amount thereof in the polyolefin composition, causes an increase of the tanδ value of the composition, which is unacceptable in a cable insulation, because of the associated power losses.

TABLE 2

| Conditioning Time (hours) | Example 1 (Polyethylene) Water content (ppm) | Example 4 (Polyethylene & PEG) Water content (ppm) | Example 6 Polyethylene & EO/PO copolymer Water content (ppm) |
|---|---|---|---|
| 19 | 2200 | 6500 | 5600 |
| 43 | 2600 | 7560 | 6570 |
| 115 | 2800 | 11420 | 7050 |
| 211 | 3500 | 19740 | 7730 |
| 355 | 3900 | 21730 | 8150 |

As it is known in the art, an electrical insulation of a cable through which an alternating current flows is the seat of losses, so that the vector representing the current is out of phase by an angle $\Phi=90°-\delta$ on the vector representing the voltage. In fact, in an electrical circuit of the reactive type, that is containing inductances and capacities, real power P (watt) is defined P=V I cosφ, where φ is the out of phase angle between current and voltage.

Tanδ=cosφ, for very small angles δ, as is the case of good insulators. The angle δ is defined as the "loss angle" and tgδ is defined as the "loss factor". In the case of alternating current cables, significant values of tgδ lead to a reduction of total power transmitted.

Example 11

The compatibility of the additive, i.e. the capability of the additive to remain in place within the polymer, has been evaluated.

The sample with the electrical insulation composition of Example 6, after its use in the electrical breakdown strength test of Example 9, in which it was aged for 6 months, was further evaluated by infrared spectroscopy to determine if there was any decrease in the amount of additive present.

In 8 measurements, a maximum decrease of less than 10% was observed and an average decrease of about 5% from the unaged sample.

For the composition of Example 4, on the basis of comparative thermal aging measurements, an additive loss speed about four times greater than that of Example 6 had been evaluated.

Table 1 shows that superior electrical breakdown retention values can be obtained with additives having either a hydrophobic portion, compatible with the polyolefin polymeric matrix (Examples 6, 7, 8) or a portion suitable to be grafted to the polyolefin polymeric matrix (Example. 5).

According to an aspect of the present invention, it is believed that the obtained superior electrical breakdown retention values can be attributed in part to the high capability of the additive of becoming linked to the polyolefin matrix (either by chemical compatibility, i.e. hydrophobicity, or by chemical bond, such as grafting).

This is believed to prevent substantial migration of the additive within the polyolefin matrix and thus, the formation of water accumulation sites which may themselves act as a structural defect causing water tree formation.

While a hydrophilic portion and a compatible portion are present in Examples 2 and 3, the relatively lower results obtained with these low molecular weight acrylate monomers (both suitable to be grafted to the polyolefin matrix), can be explained in terms of mobility of the hydrophilic portion of the additive.

These additives, when introduced in the polyethylene matrix and grafted therewith, lack mobility, due to the limited ability of the hydrophilic portion of the additive to get in contact with diffusing water its bonded extremities limit the ability of the hydrophilic portion of the additive to get in contact with the diffusing water molecules.

By contrast, one grafted additive of the present invention (Example 5) has its hydrophilic portion spaced away from the chemical linking position in the chain, thereby maintaining sufficient mobility to contact diffusing water in a sufficiently large area of the polymer.

Example 12

For each of the Examples 1–8 above, the mobility of the hydrophilic portion of the additive in the polymer has been evaluated by determining the wettability of the electrical insulating compositions including the additives.

In particular, a relatively high wettability value of the additive containing composition was considered to be due to a correspondingly high mobility of the hydrophilic portion of the additive, which can easily reach the surface and get in contact with water, allowing it to distribute on a larger surface.

Plaques were made as described in the Example 10 above, with the compositions of Examples 1, 4 and 6.

Wettability was measured by determining the contact angle value according to the method described in ASTM D 724-45, using the plaques in the place of the paper.

Tap water was used as test liquid.

The contact angle values for the remaining compounds has been estimated on the basis of theoretical considerations on the additive melecular structure.

The results are shown in the following Table 3.

TABLE 3

| Example | Additive Type | Contact Angle Value |
|---|---|---|
| 1 | none (pure XLPE) | 90 |
| 2 | *acrylate(n)etoxy derivate, n = 13 | about 80 |
| 3 | *acrylate(n)etoxy derivate, n = 3 | about 85–90 |
| 4 | *PEG | 77 |
| 5 | allyl-(n)ethoxy derivate, n = 12 | about 70 |
| 6 | EO/PO 80/20 | 64 |
| 7 | EO/PO 50/50 | about 70 |
| 8 | ethoxy/propoxy diamine deriv. | about 65–70 |

Thus, compositions having a contact angle not greater than 75° are preferred in the present invention. More preferred are compositions with a contact angle of not greater than 73° and, most preferably, not greater than 70°.

It must be observed that the values given in Table 3 are related to the specific additive content in the compositions (0.5%); higher amounts of additive can increase the wettability, but excessively high amounts of additive determine high water absorption values, which would be not acceptable in an electric cable.

Example 14

Samples were prepared with the compositions of Examples 6 and 7 with varied amounts of the additive material, according to the EFI model described above, and tested after 30 days aging. The results are set forth in Table 4, below.

TABLE 4

| | Electrical breakdown after 30 days aging (Kv/mm) | |
|---|---|---|
| Additive Conc. in XLPE (%) | copolymer EO/PO 80/20 | copolymer EO/PO 50/50 |
| 0.1 | 65 | — |
| 0.2 | 88 | 71 |
| 0.5 | 98 | 94 |
| 1.0 | 105 | 101 |
| 1.6 | — | 105 |

Example 14

Cables were made with the following structure, according to AEIC CS 5-94 specification:

Cable type: 1/0 AWG (American Wire Gauge), 175 mils (4.45 mm) insulation thickness, 15 kV.

conductor cross-section=53.5 mm²;
diameter of conductor=9.30 mm;
external diameter of inner semiconductive layer=10.10 mm
external diameter of the insulating layer=19.00 mm
external diameter of outer semiconductive layer=21.00 mm
the metallic screen was made of 6 evenly spaced copper wires, having 1.6 mm diameter, no outer sheath was used.

The conductor was a stranded conductor made of 19 aluminum wires.

No filler was used inside the conductor.
Insulation Types

The insulation of a first cable was made with the composition of Example 6 and the insulation of a second cable was made with the composition of Example 1 (reference, pure XLPE).

The cable was first subjected to 14 thermal load cycles according to AEIC CS 5-94 specification and then subjected to the accelerated water treeing test (AWTT) procedure.

After 120 days aging the average AC breakdown strength (kV/mm) was determined (the average breakdown strength was measured dividing the relevant voltage value by the insulation thickness).

The results of the test are reported in table 5 below:

TABLE 5

| Insulation type | average AC breakdown strength (kV/mm) | |
| --- | --- | --- |
| | original value (after thermal cycles) | 120 days AWTT aging |
| Example 1 | 47 | 20 |
| Example 6 | 45 | 43 |

No substantial decay of breakdown strength was observed with the composition of Example 6 compound, while with pure XLPE more than 50% decay was observed.

The results above are well in accordance with the tests on EFI model of Example 9 and corresponding results can be expected in cables with the other tested compositions.

After the AWTT test, on the cable using the compound of Example 6 additive content was measured; no significant variation of the additive concentration was measured after 120 days aging compared with the original value (0.5%).

It is believed that the good water tree resistant properties of the composition according to the present invention are due to a balance of:

a) the hydrophilic properties of the additive, i.e., the capability of blocking the water molecules diffusing in the matrix;
b) the compatibility of the additive with the insulation polymer matrix, i.e. the affinity of the additive to the matrix, permitting a constant and even distribution of the additive in the matrix; and
c) the mobility of the hydrophilic portion, i.e. its capability of reaching diffusing water, which, in combination, provide the final result.

As discussed above, in one aspect of the invention, the effect of the wettability on the result is believed to be related to the controlled "mobility" of the additive in the matrix (i.e. the capability of the additive, or at least of the hydrophilic portion thereof, to move sufficiently to get in contact with the diffusing water molecules, without being excessively free so as to allow migration of the additive itself, resulting in either the consequent formation of clusters or microdroplets of water and additive in the matrix, or a "washing away" of the additive over time.

Preferred electrical insulation compositions of the present invention comprise an additive having controlled hydrophilic properties, wherein the water content of the composition is at least 10% greater than that of the pure polyolefin (at the same aging) and increases less than 50% upon exposure to 100% relative humidity at 80° C. in the period from 100 to 400 hours of exposition.

Preferred electrical insulation compositions of the present invention can be further characterized by an additive having controlled hydrophobic properties, wherein after an aging time of 6 months in water under an electric stress of 5 kV/mm and 70° C. temperature, the residual concentration of additive in the composition is not less than 30% of the original content.

Preferred electrical insulation compositions of the present invention further comprise an additive having controlled mobility, such as a selected additive amount provides a wettability of the electrical insulation composition which corresponds to a contact angle of water on the surface of the compound, measured according to ASTM D 724–45, lower than about 75°.

According to a further aspect of the present invention, the additive can be used not only in the cable insulation layer, but also in other places within the cable, such as, for example, the inner and outer semiconductive layers, or the conductor (in which the additive can be inserted as a component of a filling composition), in an appropriate amount, which can be determined by the skilled in the art to provide the results of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrical apparatus comprising:
   a polymeric electrically insulating composition comprising a polyolefin as a major component and an effective amount of a water-tree resistant additive dispersed into said electrically insulating composition, said additive having:
      a hydrophilic portion, causing a water absorption in said polymeric insulation layer within a selected absorption range,
      a compatible portion with said polyolefin, causing an additive loss by contact with water lower than a selected loss value,
   said hydrophilic portion having a mobility suitable to allow the hydrophilic portion of the additive to effectively reach and link water molecules diffusing in said electrically insulating composition, and wherein said electrically insulating composition comprises no carbon black, such that said electrical apparatus has a residual electrical breakdown strength greater than about 35 kV/mm upon 120 days accelerated water treeing test according to AEIC CS 5-94.

2. The electrical apparatus according to claim 1, characterized in that said water absorption is such that the water content of said electrically insulating composition is at least 10% higher than that of the same pure polyolefin with the same aging and increases less than 50% in the period from 100 to 400 hours of exposure to 100% relative humidity at 80° C.

3. The electrical apparatus according to claim 1, characterized in that said water absorption is such that the water content of said electrically insulating composition is less than 10,000 ppm after 400 hours of exposure to 100% relative humidity at 80° C.

4. The electrical apparatus according to claim 1, characterized in that said mobility corresponds to a contact angle with water of said polymeric insulation layer of less than 75°.

5. The electrical apparatus according to claim 4, characterized in that said contact angle is less than 70°.

6. The electrical apparatus according to claim 1, characterized in that said additive loss is not greater than 20% by weight after 120 days accelerated water treeing test according to AEIC CS 5-94.

7. The electrical apparatus according to claim 1, characterized in that said polyolefin is selected from the group consisting of low, medium and high density polyethylene, linear low density polyethylene, ethylene-vinyl acetate copolymer, ethylene-ethyl acrylate copolymer, ethylene-methyl acrylate copolymer, ethylene-ethyl methacrylate copolymer, ethylene-propylene copolymer, ethylene-propylene-diene terpolymer, polypropylene, and mixtures thereof.

8. An electrical apparatus having at least one polymeric insulation layer, said layer comprising an electrically insulating composition containing as a major component a polyolefin, said electrically insulating composition characterized in that said composition comprises an effective amount of a water-tree resistant additive having:
  a hydrophilic portion made up of polar units,
  a compatible portion with said polyolefin, said compatible portion being selected between hydrophobic portions and graftable portions;
  said electrical apparatus having a residual electrical breakdown strength greater than about 35 kV/mm upon 120 days accelerated water treeing test according to AEIC CS 5-94;
and wherein said electrically insulating composition comprises no carbon black.

9. The electrical apparatus according to claim 8, characterized in that the additive has more than about 30% of oxygen atoms in the molecule, and the polar units are linear alkene oxide units.

10. The electrical apparatus according to claim 9, wherein the linear alkene oxide is ethylene oxide.

11. The electrical apparatus according to claim 8, characterized in that the compatible portion is made of aliphatic, aromatic or low polarity units.

12. The electrical apparatus according to claim 10, characterized in that the compatible portion is a hindered alkene oxide.

13. The electrical apparatus according to claim 11, characterized in that the compatible portion is propylene oxide.

14. The electrical apparatus according to claim 13, characterized in that the additive is an ethylene-oxide/propylene-oxide block copolymer.

15. The electrical apparatus according to claim 14, characterized in that the ethylene oxide portion in the additive is from 35 to 95% by weight.

16. The electrical apparatus according to claim 15, characterized in that the ethylene oxide portion in the additive is from 50 to 80% by weight.

17. The electrical apparatus according to claim 8, characterized in that the compatible portion is a group graftable to said polyolefin.

18. The electrical apparatus according to claim 17, characterized in that the graftable group is an unsaturated aliphatic unit.

19. The electrical apparatus according to claim 18, characterized in that the graftable group is an allyl containing group.

20. The electrical apparatus according to claim 8, characterized in that the compatible portion and the hydrophilic portion are chemically linked to a low polarity group.

21. The electrical apparatus according to claim 20, characterized in that the compatible portion and the hydrophilic portion are chemically linked to an amino group.

22. The electrical apparatus according to claim 21, characterized in that the amino group is ethylenediamine.

23. The electrical apparatus according to claim 1, wherein said effective amount of water-tree resistant additive is from about 0.05 to about 10% by weight, based on the total weight of the polymeric electrically insulating composition.

24. The electrical apparatus according to claim 23, wherein said effective amount of water-tree resistant additive is from about 0.2 to about 1% by weight, based on the total weight of the polymeric electrically insulating composition.

25. A method for reducing water trees growth in an electrical apparatus comprising a polymeric electrically insulating composition including a polyolefin as a major component, comprising the steps of:
  a) dispersing into said electrically insulating composition an effective amount of a water tree resistant additive having:
    a hydrophilic portion, causing a water absorption in said polymeric insulation layer within a selected absorption range,
    a compatible portion with said polyolefin, causing an additive loss by contact with water lower than a selected loss value,
  b) causing diffusing water to become linked to the additive in the operating condition of the electrical apparatus by means of said hydrophilic portion;
  c) causing said additive to remain dispersed in said electrically insulating composition in the operating condition of the electrical apparatus by means of said compatible portion;
  wherein said electrically insulating composition comprises no carbon black; and
whereby the electrical apparatus has a residual electrical breakdown strength greater than about 35 kV/mm upon 120 days accelerated water treeing test according to AEIC CS 5-94.

26. The method for reducing water trees growth according to claim 25, wherein said water tree resistant additive is substantially free to move within said electrically insulating composition, causing at least a portion of said additive to move and contact said diffusing water.

27. The method for reducing water trees growth according to claim 26, wherein said water tree resistant additive has a hydrophobic molecular portion, causing said additive to link to said electrically insulating composition.

28. The method for reducing water trees growth according to claim 25, wherein said water tree resistant additive is grafted to said electrically insulating composition, causing said additive to link to said electrically insulating composition.

29. The method for reducing water trees growth according to claim 28, wherein said water tree resistant additive is grafted to said electrically insulating composition and has said hydrophilic portion spaced apart from the graft position, causing at least a portion of said additive to move and contact diffusing water.

* * * * *